United States Patent
Chiang et al.

(10) Patent No.: US 12,506,731 B2
(45) Date of Patent: Dec. 23, 2025

(54) CONFERENCE DATA SHARING METHOD AND CONFERENCE DATA SHARING SYSTEM CAPABLE OF COMMUNICATING WITH REMOTE CONFERENCE MEMBERS

(71) Applicants: BenQ Intelligent Technology (Shanghai) Co., Ltd, Shanghai (CN); BENQ CORPORATION, Taipei (TW)

(72) Inventors: Chin-Fu Chiang, Taipei (TW); Chen-Chi Wu, Taipei (TW); Chia-Nan Shih, Taipei (TW); Lin-Yuan You, Taipei (TW); Chuang-Wei Wu, Taipei (TW); Jung-Kun Tseng, Taipei (TW)

(73) Assignees: BenQ Intelligent Technology (Shanghai) CO., LTD, Shanghai (CN); BenQ Corporation, Taipei (TW)

(*) Notice: Subject to any disclaimer, the term of this patent is extended or adjusted under 35 U.S.C. 154(b) by 0 days.

(21) Appl. No.: 17/235,960

(22) Filed: Apr. 21, 2021

(65) Prior Publication Data

US 2021/0344671 A1    Nov. 4, 2021

(30) Foreign Application Priority Data

Apr. 30, 2020   (CN) .......................... 202010366517.8

(51) Int. Cl.
H04L 9/40    (2022.01)
H04L 12/18   (2006.01)

(52) U.S. Cl.
CPC ...... *H04L 63/0846* (2013.01); *H04L 12/1818* (2013.01); *H04L 12/1827* (2013.01); *H04L 63/18* (2013.01)

(58) Field of Classification Search
None
See application file for complete search history.

(56) References Cited

U.S. PATENT DOCUMENTS

| | | |
|---|---|---|
| 8,531,502 B2 | 9/2013 | Cheng |
| 2009/0112671 A1 | 4/2009 | Grodum |
| 2010/0223334 A1 | 9/2010 | Narayanan |
| 2014/0218379 A1* | 8/2014 | Jia .............................. G06T 1/20 345/520 |
| 2017/0310826 A1 | 10/2017 | Gunasekar |
| 2017/0339199 A1* | 11/2017 | Saez ................... H04L 65/4015 |
| 2018/0121663 A1* | 5/2018 | Hassan ................... G06F 21/84 |

(Continued)

FOREIGN PATENT DOCUMENTS

| | | |
|---|---|---|
| CN | 108391079 A | 8/2018 |
| CN | 110231924 A | 9/2019 |
| TW | 201114228 A1 | 4/2011 |

*Primary Examiner* — Kevin S Mai (57) ABSTRACT

A conference data sharing method includes triggering a transmitter coupled to an image signal source, transmitting a triggering signal from the transmitter to a receiver through a first network, generating at least one data signal according to a conference member list after the receiver receives the triggering signal, transmitting the at least one data signal to at least one conference member through a second network, transmitting an image signal from the image signal source to the transmitter after the transmitter is triggered, processing the image signal by the transmitter for transmitting the image signal to the receiver through the first network, and controlling a display device for displaying an image by the receiver according to the image signal.

16 Claims, 4 Drawing Sheets

(56) References Cited

U.S. PATENT DOCUMENTS

2019/0166169 A1\* 5/2019 Norum .................... H04L 65/65
2019/0199773 A1 6/2019 Maeda
2020/0389622 A1 12/2020 Chiang \* cited by examiner

CONFERENCE DATA SHARING METHOD AND CONFERENCE DATA SHARING SYSTEM CAPABLE OF COMMUNICATING WITH REMOTE CONFERENCE MEMBERS

BACKGROUND OF THE INVENTION

1. Field of the Invention

The present invention illustrates a conference data sharing method and a conference data sharing system, and more particularly, a conference data sharing method and a conference data sharing system capable of communicating with remote conference members.

2. Description of the Prior Art

With the rapid development of science and technology, various projector systems and conference reporting systems have been adopted in our daily life. The conference reporting system can be integrated with a projector system for increasing the operational convenience of a presenter when data is presented. Currently, the conference reporting systems use wireless or wired communications for transmitting data to a display device. The data communications methods can be categorized into two modes. In the first mode, specific software has to be installed in computers operated by members participating in a conference. The computer can identify several hardware components such as a hard disk, a universal serial bus (USB), and a CD-ROM device. Then, data saved in previously mentioned physical or virtual storage devices can be transmitted to a screen or display device through a wireless network. In the second mode, the computers operated by the members participating in the conference can be linked to transmitters. The transmitters are linked to the screen or display device through a receiver. Therefore, after the computers are linked to transmitters, the data of the computer can be displayed on the screen or display device through the receiver. In recent years, the conference reporting systems can use wireless communications technologies for increasing operational efficiency. Further, since conference reporting information can be transmitted through a wireless link, a risk of information leakage may occur. Therefore, how to reduce the risk of the information leakage is also a very important issue. In other words, it is an inevitable trend to develop a conference data sharing method with high security, high convenience, and capable of dynamically adjusting authorized actions.

SUMMARY OF THE INVENTION

In an embodiment of the present invention, a conference data sharing method is disclosed. The conference data sharing method comprises triggering a transmitter coupled to an image signal source, transmitting a triggering signal from the transmitter to a receiver through a first network, generating at least one data signal according to a conference member list after the receiver receives the triggering signal, transmitting the at least one data signal to at least one conference member through a second network, transmitting an image signal from the image signal source to the transmitter after the transmitter is triggered, processing the image signal by the transmitter for transmitting the image signal to the receiver through the first network, and controlling a display device for displaying an image by the receiver according to the image signal.

In another embodiment of the present invention, a conference data sharing system is disclosed. The conference data sharing system comprises an image signal source, a transmitter, a receiver, and a display device. The image signal source is used for generating an image signal. The transmitter is coupled to the image signal source for buffering and transmitting the image signal. The receiver is used for receiving the image signal and generating at least one data signal. The display device is coupled to the receiver for displaying an image. After the transmitter is triggered, the transmitter generates a triggering signal to the receiver through a first network. The receiver generates the at least one data signal according to a conference member list after the receiver receives the triggering signal. The receiver transmits the at least one data signal to at least one conference member through a second network. The image signal source transmits the image signal to the transmitter after the transmitter is triggered. The transmitter processes the image signal for transmitting the image signal to the receiver through the first network. The receiver controls the display device for displaying the image according to the image signal.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
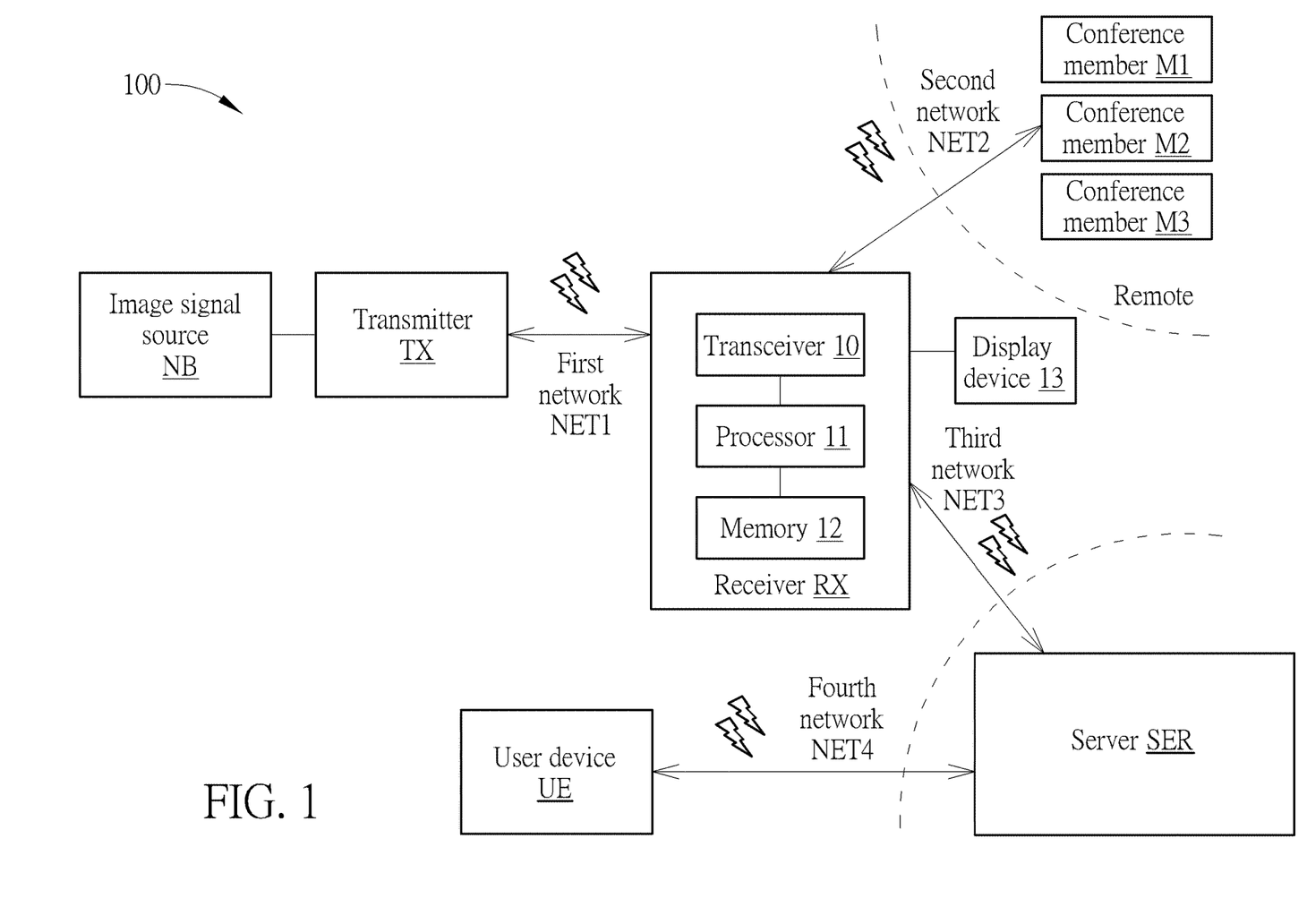
FIG. 1 is a block diagram of a conference data sharing system according to an embodiment of the present invention.

FIG. 1 is a block diagram of a conference data sharing system 100 according to an embodiment of the present invention. The conference data sharing system 100 includes an image signal source NB, a transmitter TX, a receiver RX, and a display device 13. The image signal source NB is used for generating an image signal. The image signal source NB can be an audio-video (A/V) output device, such as a desktop computer, a notebook, or a tablet. The transmitter TX is coupled to the image signal source NB for buffering and transmitting the image signal. The receiver RX is used for receiving the image signal and generating at least one data signal. The display device 13 is linked to the receiver RX for displaying images. The display device 13 can be any display, such as a screen or a TV wall. In the conference data sharing system 100, the receiver RX may include a transceiver 10, a processor 11, and a memory 12. The transceiver 10 is used for accessing data. Also, the transceiver 10 can be used for communicating with the transmitter TX through a first network NET1. The first network NET1 may be a wireless network, such as a wireless network having a Wi-Fi protocol. The processor 11 is coupled to the transceiver 10 for generating conference data and confidential (or say, encrypted) data signals. The conference data of the conference data sharing system 100 can be a video signal outputted from an image signal source NB, a processed picture-in-picture video, or a split-screen video. The confidential data signal may include a network link and/or a password of the conference data. The conference data is timeliness. Therefore, the processor 11 has a key generator function and a data processing function. The memory 12 is coupled to the processor 11 for saving data. The memory 12 can be used for saving account number data of the receiver RX on the network, conference member list data, and the conference scheduling data. The conference member list can be pre-defined and saved in the memory 12, or can be determined according to conference notification group mail data, group list data of a communication application, and/or member list data of a communication database. The conference scheduling data can correspond to the timeliness of the confidential data signals (i.e., such as authorization key data).

In the conference data sharing system 100, after the transmitter TX is triggered, the transmitter TX can generate a triggering signal to the receiver RX through the first network NET1. The receiver RX generates the at least one data signal according to a conference member list after the receiver RX receives the triggering signal. The at least one data signal can include authorization key data, conference recording data, and/or conference scheduling data. The conference scheduling data can include timeliness information of the authorization key data. Then, the receiver RX can transmit the at least one data signal to at least one conference member through a second network NET2. For example, the receiver RX can transmit a data signal having the authorization key information to one or more remote conference members M1 to M3 through the second network NET2. After at least one conference member receives the data signal, the at least one conference member can use the key (i.e., such as a website address and/or password) of the data signal for browsing the conference data (i.e., for example, browsing a screen image or conference record data). In other words, the conference data can be shared with at least one conference member through the second network NET2. Further, the image signal source NB can transmit the image signal to the transmitter TX after the transmitter TX is triggered. The transmitter TX can process the image signal for transmitting the image signal to the receiver RX through the first network NET1. The receiver RX can control the display device 13 for displaying the image according to the image signal. Further, in the conference data sharing system 100, a user who triggers the transmitter TX and manipulates the image signal source NB can be a conference member located inside a conference room. A user who receives the data signal having the authorization key information can be a conference member located outside the conference room. The second network NET2 can be a network for applying to external data communication. In other words, for the conference members M1 to M3, the receiver RX can be regarded as a relay node for transmitting the conference data. Further, the browsing authority of the conference data can be determined by a key generated by the receiver RX.

As previously mentioned, the memory 12 can be used for saving account member data of the receiver RX on the network, conference member list data, and the conference scheduling data. Further, the conference member list data and the conference scheduling data can be pre-configured. For example, as shown in FIG. 1, the conference data sharing system 100 can further introduce a user device UE. The user device UE is capable of performing a wireless communication function. The user device UE can be operated by a conference initiator for communicating with the receiver RX. The user device UE can be a smartphone, a notebook, a tablet, or a desktop computer. The conference initiator can use the user device UE for setting the conference member list and the conference scheduling data. The conference initiator can use the user device UE for setting sharing authority of each conference member of the conference member list for transmitting sharing authority data of each conference member to the receiver RX. The conference initiator can pre-set the sharing authority of each conference member of the conference member list before a conference starts, or can dynamically set the sharing authority of each conference member of the conference member list during the conference. Further, the conference data sharing system 100 can use any method for setting the receiver RX. For example, the conference data sharing system 100 can introduce a server SER. The server SER is linked to the receiver RX for communicating with the receiver RX through a third network NET3. Further, the server SER is linked to the user device UE through a fourth network NET4. The server SER can be an email server or a message server. The conference initiator can use the user device UE for transmitting the conference member list and configurations of the sharing authority of each conference member to the server SER (i.e., such as an email). The server SER can relay the conference member list and the sharing authority configurations of each conference member to the receiver RX. Further, the conference member list of the receiver RX and the sharing authority configurations of each conference member can be edited. Then, the receiver RX can notify the sharing authority data to each conference member. Further, after the receiver RX notifies the sharing authority data to a conference member, when the conference member is authorized (i.e., such as the conference member M2), a transmitter of the conference member M2 can be triggered. Then, the conference member can acquire a network link and/or a password of the conference data. Further, the sharing authority of the conference data can be defined as configurations of blocking a certain part of conference contents, browsing authority configurations of the conference data during a time interval, and/or access configurations (read/write) of the conference data. Any reasonable setting method of the sharing authority of the conference data falls into the scope of the present invention. Further, as previously mentioned, since the second network NET2 can be an external communication network, the receiver RX can directly transmit at least one data signal (i.e., such as authorization key information) to the a communication address account of the at least one conference member through the second network NET2, such as an email address, an instant messaging account, or a chat room account. Alternatively, the receiver RX can transmit the at least one data signal to a communication device of the at least one conference member through the second network NET2. For example, the receiver RX can transmit the at least one data signal (i.e., in form of data packets) to a notebook used by the at least one conference member. Further, the conference data sharing system 100 can also relay key information for authorizing more users to browse the conference data. For example, the at least one data signal transmitted from the at least one conference member can be relayed to another conference member for sharing the conference data with another conference member through the second network NET2 after the at least one conference member receives the at least one data signal. For example, after at least one conference member receives the data signal, the at least one conference member can relay the data signal to another conference member. Therefore, the conference data can be shared with another conference member through the second network NET2. For example, in FIG. 1, when the remote conference member M2 receives a URL and/or a password of the conference data, the URL and/or the password can be transmitted to the conference member M2 by using an email address or an instant message. By doing so, the conference data information can be shared with the conference member M3 through the second network NET2. In the conference data sharing system 100, any hardware or technology modification falls into the scope of the present invention.

Figure 2:
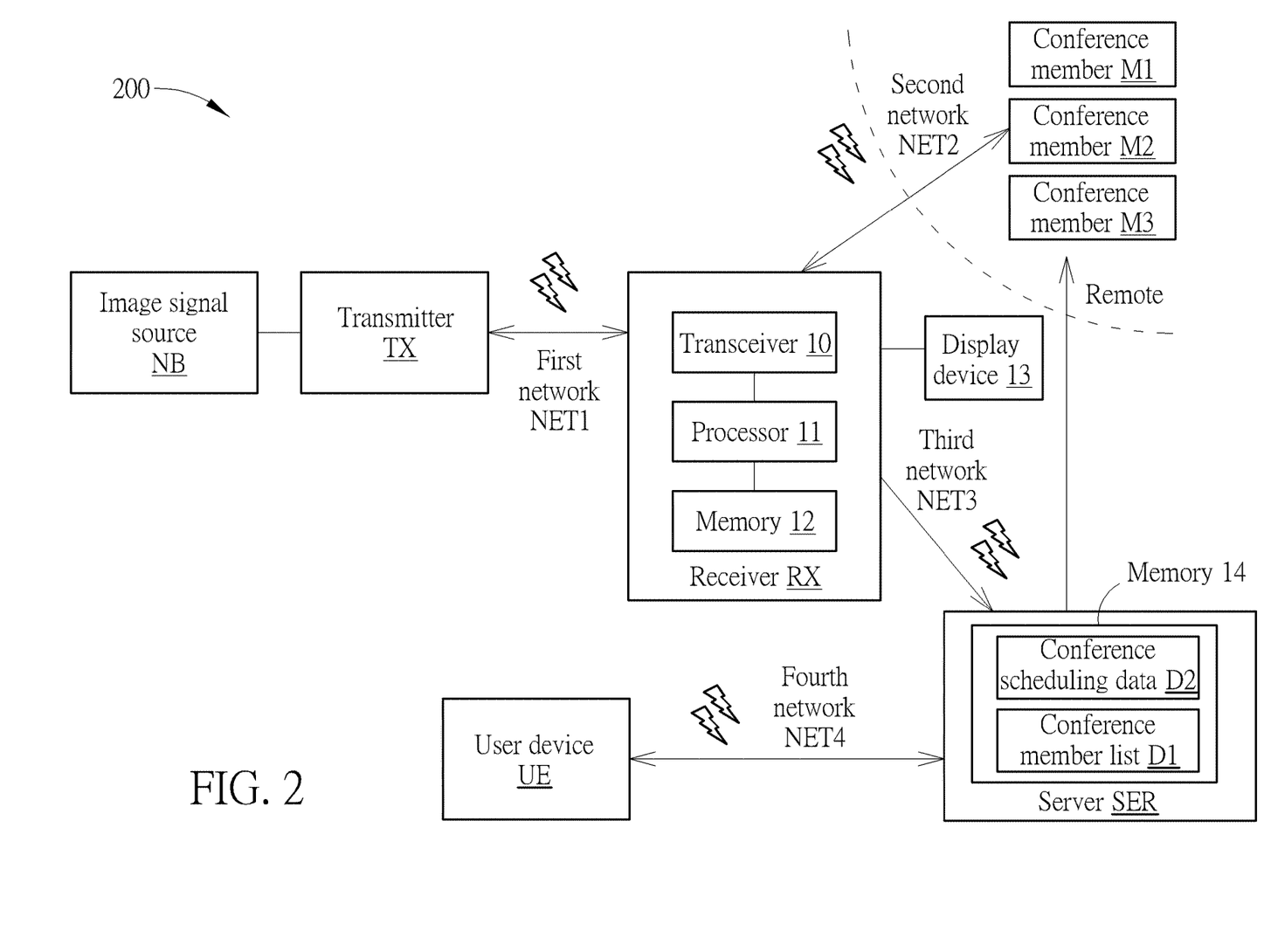
FIG. 2 is an illustration of relaying data from a server to at least one conference member of the conference data sharing system in FIG. 1.

FIG. 2 is an illustration of relaying data from the server SER to at least one conference member M1 to M3 of the conference data sharing system 100. The conference data sharing system in FIG. 2 is similar to the conference data sharing system 100 in FIG. 1. For avoiding ambiguity, the conference data sharing system in FIG. 2 is called as the conference data sharing system 200. In the conference data sharing system 200, the memory 14 of the server SER can save the conference member list D1 and the conference scheduling data D2. After the receiver RX sets the account number of the network, the receiver RX can request the server SER through the third network NET3 for acquiring the conference member list D1 and/or the conference scheduling data D2 from the server SER. As previously mentioned, the conference member list D1 and/or conference scheduling data D2 in the server SER can be set by the conference initiator. In the conference data sharing system 200, the receiver RX can transmit at least one data signal (i.e., including authorization key information) to the server SER. Then, the server SER can relay the at least one data signal to the conference members M1 to M3. Further, the receiver RX can also acquire the conference scheduling data D2 from the server SER. The receiver RX can also transmit the at least one data signal to at least one of the conference members M1 to M3 through the second network NET2. In other words, the authorization key information generated by the receiver RX can be transmitted to the remote conference members M1 to M3 through two paths. A first path can be regarded as a direct transmission path, defined as the receiver RX directly transmitting the authorization key information to the conference members M1 to M3. A second path can be regarded as a relay path, defined as the receiver RX relaying the authorization key information to the conference members M1 to M3 through the server SER. Further, the at least one data signal transmitted from the receiver RX to at least one conference member M1 to M3 through the second network NET2, and the data signal transmitted from the server SER to the conference member M1 to M3 are timeliness. Further, the at least one data signal can include the authorization key information. The at least one data signal corresponds to one or more conference members. The conference data sharing system 200 can transmit sharing authority data to the conference members. The number of conference members can be dynamically changed over time. Further, the receiver RX has a list of virtual user accounts. For example, the receiver RX can include a list of email addresses of conference members. The receiver RX can transmit email information to the at least one conference member (M1 to M3) according to the list of virtual user accounts. Alternatively, the receiver RX can receive email information transmitted from the at least one conference member (M1 to M3) according to the list of virtual user accounts. The receiver RX can determine conference settings based on contents of the email information.

Figure 3A:
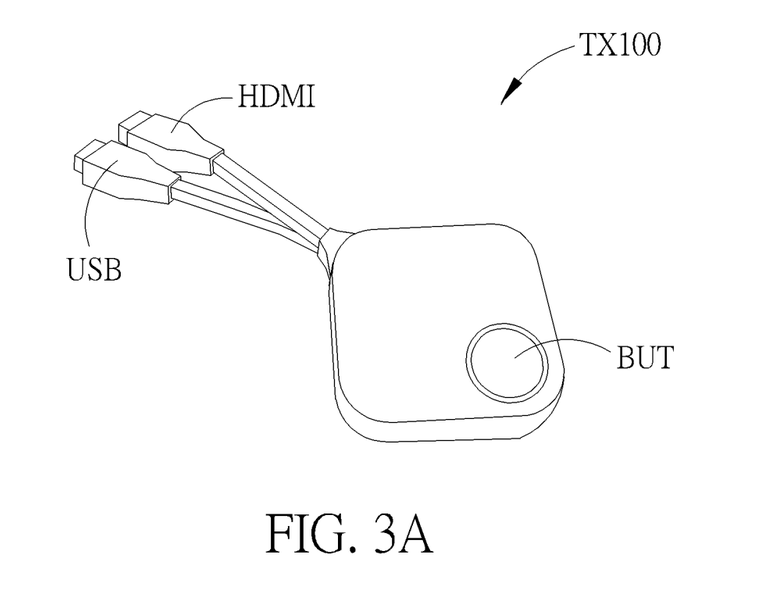
FIG. 3A is an illustration of a first appearance of a transmitter of the conference data sharing system in FIG. 1.
Figure 3B:
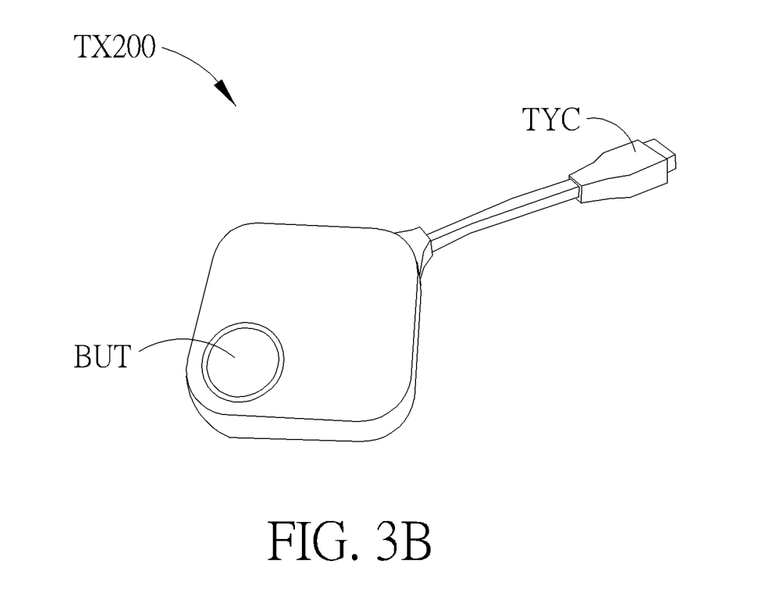
FIG. 3B is an illustration of a second appearance of a transmitter of the conference data sharing system in FIG. 1.

FIG. 3A is an illustration of a first appearance of the transmitter TX of the conference data sharing system 100 or 200. FIG. 3B is an illustration of a second appearance of the transmitter TX of the conference data sharing system 100 or 200. To avoid ambiguity, the transmitter in FIG. 3A is denoted as a transmitter TX100 hereafter. The transmitter in FIG. 3B is denoted as a transmitter TX200 hereafter. As shown in FIG. 3A and FIG. 3B, the transmitter TX100 and the transmitter TX200 have buttons BUT. The button BUT can also be regarded as a control button for triggering transmission of the image signal to the receiver RX. For example, after the transmitter TX100 is paired with the receiver RX for establishing a link, when the user presses the button BUT of the transmitter TX100, the transmitter TX100 can transmit the image signal to the receiver RX. The receiver RX can control the display device 13 for displaying images according to the image signal. Further, as previously mentioned, the transmitter can be linked to a corresponding image signal source (i.e., such as a notebook). Therefore, the transmitter can include at least one data transmission port. For example, the transmitter TX100 can use the USB Type-A transmission port USB and/or the High Definition Multimedia Interface (HDMI) transmission port HDMI for linking to the corresponding image signal source. Further, the transmitter TX200 can be linked to the corresponding image signal source by using a C-type universal serial bus (USB Type-C) transmission port TYC. However, embodiments of the present invention are not limited to signal formats. Any reasonable hardware modification such as a cable length, a transmission port specification, or a device appearance design falls into the scope of the present invention.

Further, in the conference data sharing system 100 and 200, the transmitter TX can be regarded as a virtual display device, as illustrated below. For example, when the transmitter TX is coupled to the image signal source NB, the transmitter TX can transmit extended display identification data (EDID) to a data processing device of the image signal source NB (i.e., the central processing unit or graphics card of a notebook). Further, the data processing device can identify the transmitter TX as the virtual display device according to the EDID for wirelessly transmitting the image signal to the transmitter TX after the data processing device receives the EDID. Then, the transmitter TX can transmit the image signal to the receiver RX for displaying images.

Figure 4:
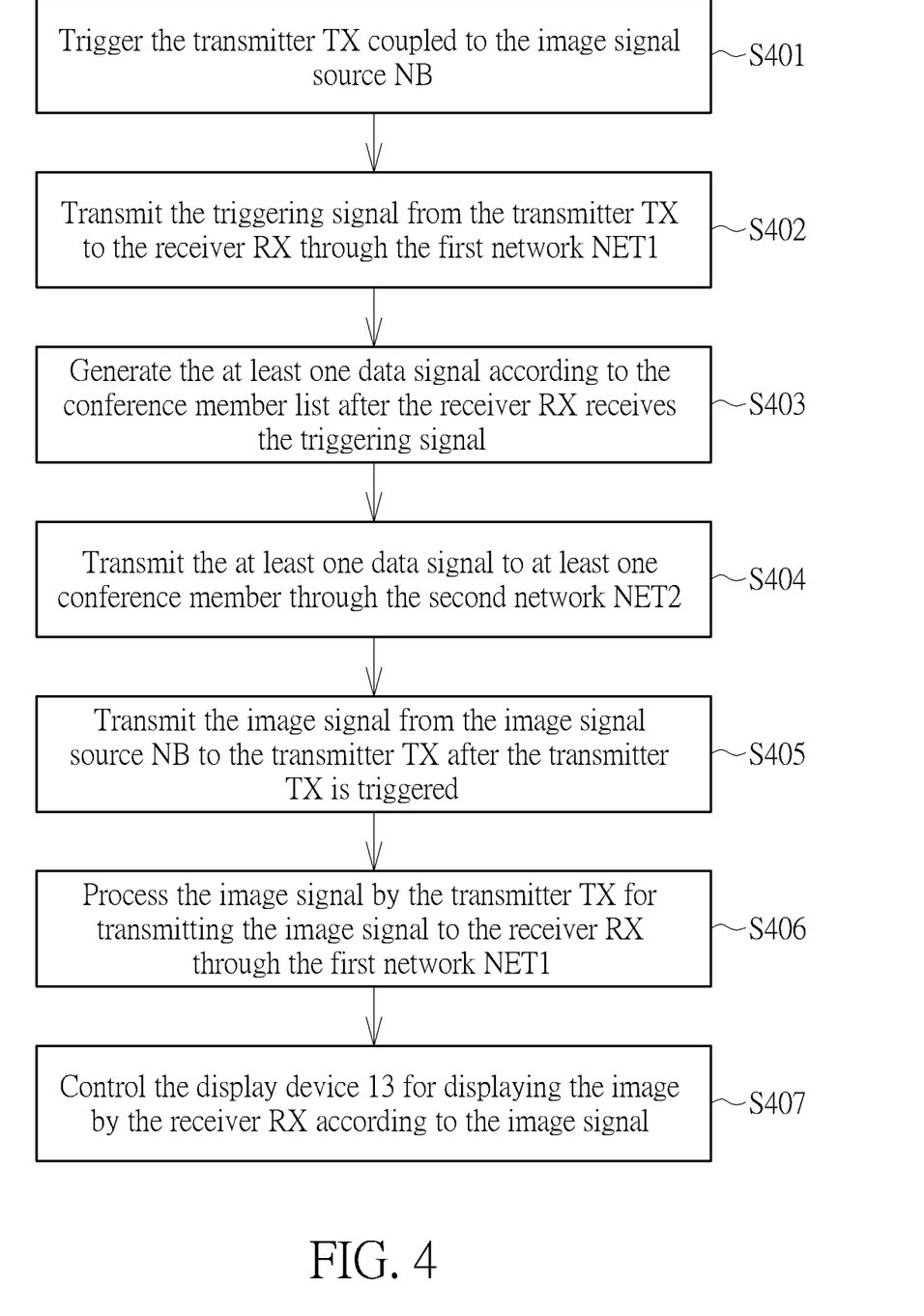
FIG. 4 is a flow chart of a conference data sharing method performed by the conference data sharing system in FIG. 1.

FIG. 4 is a flow chart of a conference data sharing method performed by the conference data sharing system 100. The conference data sharing method includes step S401 to step S407. Any reasonable technology modification falls into the scope of the present invention. Step S401 to step S407 are illustrated below.

Step S401: trigger the transmitter TX coupled to the image signal source NB;

Step S402: transmit the triggering signal from the transmitter TX to the receiver RX through the first network NET1;

Step S403: generate the at least one data signal according to the conference member list after the receiver RX receives the triggering signal;

Step S404: transmit the at least one data signal to at least one conference member through the second network NET2;

Step S405: transmit the image signal from the image signal source NB to the transmitter TX after the transmitter TX is triggered;

Step S406: process the image signal by the transmitter TX for transmitting the image signal to the receiver RX through the first network NET1;

Step S407: control the display device 13 for displaying the image by the receiver RX according to the image signal.

Details of step S401 to step S407 are previously illustrated. Thus, they are omitted here. In the conference data sharing system 100, the receiver RX can generate the data signal including authorization key information. Therefore, when the data signal including the authorization key information is transmitted to another conference room or at least one remote conference member, the at least one remote conference member can use the authorization key information for browsing restricted or unrestricted conference data. Therefore, the conference data sharing system of the present invention is capable of performing high security and high operational flexibility conference data sharing function.

To sum up, the present invention discloses a conference data sharing method and a conference data sharing system. The conference data sharing method and the conference data sharing system have the following advantages. First, the conference data sharing system has high security and can enhance security level. The reason is that the conference data sharing system can generate authorization key information instead of using software installed in computers. In the conference data sharing system, the data signal including the authorization key information is generated by the receiver. Therefore, a risk of data leakage can be reduced. Second, the conference data sharing system has high convenience and flexibility for operating its functions. The reason is that the transmitter has a hotkey for triggering transmission of the image signal. Therefore, when a user presses the hot key, the image signal can be transmitted to the receiver. The receiver can control the display device for displaying images. Third, the conference data sharing system can dynamically adjust the authorization configurations. Therefore, the conference data sharing system of the present invention is capable of performing high security and high operational flexibility conference data sharing function.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A conference data sharing method comprising:
pairing a transmitter coupled to an image signal source with a receiver to establish a first network between the transmitter and the receiver;
triggering the transmitter;
transmitting a triggering signal from the transmitter to the receiver through the first network;
setting a network name of the receiver;
establishing a second network between at least one conference member and the receiver, wherein the second network is configured to perform external data communications from one conference room to another conference room, and the at least one conference member comprises at least one remote conference member;
requesting a server for acquiring a conference member list through a third network by the receiver after an account number of a network is configured;
performing a key generator function to generate authorization key data by a processor within the receiver, the authorization key data being dynamically generated by the processor within the receiver based on timeliness information and independent of any external server;
generating at least one data signal having the authorization key data according to the conference member list after the receiver receives the triggering signal;
the receiver directly transmitting the at least one data signal having the authorization key data to a communication address account or a communication device of the at least one conference member through the second network;
relaying the authorization key data from the receiver to the at least one conference member by the server through the third network;
managing the at least one remote conference member according to the authorization key data so that the at least one remote conference member uses the authorization key data for browsing restricted or unrestricted conference data;
pressing a button disposed on the transmitter to trigger the transmitter after the first network between the transmitter and the receiver is established;
transmitting an image signal from the image signal source to the transmitter after the transmitter is triggered by the button;
processing the image signal by the transmitter for transmitting the image signal to the receiver through the first network;
controlling a display device for displaying an image by the receiver according to the image signal; and
setting a sharing authority of a conference member of the conference member list for transmitting sharing authority data of the conference member to the receiver;
wherein after the receiver notifies the conference member according to the sharing authority data, when the conference member is authorized, a transmitter of the conference member is triggered so that the conference member acquires a network link and/or a password of conference data; and
wherein the conference member list is set by a conference initiator, the at least one data signal comprises the authorization key data, conference recording data, and/or conference scheduling data, and the conference scheduling data comprises the timeliness information of the authorization key data.

2. The method of claim 1, further comprising:
sharing the conference data to the at least one conference member through the second network after the at least one conference member receives the at least one data signal.

3. The method of claim 1, wherein the transmitter of the conference member is triggered by the conference member inside a conference room, and the at least one conference member is located outside the conference room.

4. The method of claim 3, wherein the conference member list is determined according to conference notification group mail data, group list data of a communication application, and/or member list data of a communication database, and the at least one conference member located outside the conference room acquires a network link and/or a password of the receiver.

5. The method of claim 1, wherein the conference member list is predefined, or is determined according to conference notification group mail data, group list data of a communication application, and/or member list data of a communication database.

6. The method of claim 1, further comprising:
setting the conference scheduling data by the conference initiator; and notifying the sharing authority data of each conference member to the each conference member by using the receiver.

7. The method of claim 6, wherein setting the sharing authority of the each conference member of the conference member list by the conference initiator, is pre-setting the sharing authority of the each conference member of the conference member list by the conference initiator before a conference starts, or dynamically setting the sharing authority of the each conference member of the conference member list by the conference initiator during the conference.

8. The method of claim 1, further comprising:
transmitting a data signal from the receiver to the server;
transmitting the data signal from the server to a conference member through the third network; and
acquiring the conference scheduling data by the receiver;
wherein the at least one data signal transmitted from the receiver to at least one conference member through the second network, and the data signal transmitted from the server to the conference member through the third network are timeliness.

9. The method of claim 1, further comprising:
transmitting extended display identification data (EDID) from the transmitter coupled to the image signal source to a data processing device of the image signal source; and
identifying the transmitter coupled to the image signal source as a virtual display device by the data processing device according to the EDID for wirelessly transmitting the image signal to the transmitter coupled to the image signal source after the data processing device receives the EDID.

10. The method of claim 1, wherein the receiver has a list of virtual user accounts, the receiver transmits email information to the at least one conference member according to the list of virtual user accounts, or the receiver receives email information transmitted from the at least one conference member according to the list of virtual user accounts.

11. A conference data sharing system comprising:
an image signal source configured to generate an image signal;
a transmitter coupled to the image signal source and configured to buffer and transmit the image signal;
a receiver configured to receive the image signal and generate at least one data signal;
a display device coupled to the receiver and configured to display an image; and
a server linked to the receiver and configured to communicate with the receiver;
wherein the transmitter and the receiver are paired to establish a first network between the transmitter and the receiver, after the transmitter is triggered, the transmitter generates a triggering signal to the receiver through the first network, the receiver sets a network name, the receiver establishes a second network between at least one conference member and the receiver, the second network is configured to perform external data communications from one conference room to another conference room, the at least one conference member comprises at least one remote conference member, the receiver requests the server for acquiring a conference member list through a third network after an account number of a network is configured, a processor within the receiver performs a key generator function to generate authorization key data, the authorization key data is dynamically generated by the processor within the receiver based on timeliness information and independent of any external server, the receiver generates the at least one data signal having the authorization key data according to the conference member list after the receiver receives the triggering signal, the receiver directly transmits the at least one data signal having the authorization key data to a communication address account or a communication device of the at least one conference member through the second network, the receiver relays the authorization key data to the at least one conference member by the server through the third network, the receiver manages the at least one remote conference member according to the authorization key data so that the at least one remote conference member uses the authorization key data for browsing restricted or unrestricted conference data, a button disposed on the transmitter is pressed to trigger the transmitter after the first network between the transmitter and the receiver is established, the image signal source transmits the image signal to the transmitter after the transmitter is triggered by the button, the transmitter processes the image signal for transmitting the image signal to the receiver through the first network, and the receiver controls the display device for displaying the image according to the image signal, a sharing authority of a conference member of the conference member list is set for transmitting sharing authority data of the conference member to the receiver, after the receiver notifies the conference member according to the sharing authority data, when the conference member is authorized, a transmitter of the conference member is triggered so that the conference member acquires a network link and/or a password of conference data, the at least one data signal comprises the authorization key data, conference recording data, and/or conference scheduling data, the conference scheduling data comprises the timeliness information of the authorization key data, and the conference member list is set by a conference initiator.

12. The system of claim 11, wherein the transmitter of the conference member is triggered by the conference member inside a conference room, and the at least one conference member is located outside the conference room.

13. The system of claim 11, wherein the receiver further comprises:
a transceiver configured to access data; and
a memory coupled to the processor and configured to save data;
wherein the processor is coupled to the transceiver and configured to generate the conference data and perform the key generator function to dynamically generate authorization key data based on the timeliness information and independent of any external server, the conference member list is predefined and saved in the memory, or is determined according to conference notification group mail data, group list data of a communication application, and/or member list data of a communication database.

14. The system of claim 11, further comprising:
a user device operated by the conference initiator for communicating with the receiver;
wherein the conference initiator uses the user device for setting the conference member list and conference scheduling data, and the receiver notifies the sharing authority data of each conference member to the each conference member.

15. The system of claim 14, wherein the conference initiator pre-sets the sharing authority of the each conference member of the conference member list before a conference starts, or dynamically sets the sharing authority of the each conference member of the conference member list during the conference.

16. The system of claim 11, wherein the receiver transmits a data signal to the server, the server transmits the data signal to a conference member through the third network, the receiver acquires the conference scheduling data; and
    wherein the at least one data signal transmitted from the receiver to at least one conference member through the second network, and the data signal transmitted from the server to the conference member through the third network are timeliness.

\* \* \* \* \*